United States Patent [19]
Urich et al.

[11] Patent Number: 5,930,987
[45] Date of Patent: Aug. 3, 1999

[54] HARVESTING APPARATUS

[75] Inventors: Oren D. Urich; Daryl W. Urich, both of Ft. Collins, Colo.

[73] Assignee: Multi-Picker International, Inc., Ft. Collins, Colo.

[21] Appl. No.: 08/927,888

[22] Filed: Sep. 11, 1997

Related U.S. Application Data

[60] Provisional application No. 60/026,586, Sep. 20, 1996.

[51] Int. Cl.⁶ .................................................. A01D 43/00
[52] U.S. Cl. .......................... 56/14.5; 56/16.6; 56/327.1; 460/23
[58] Field of Search .................................. 56/14.5, 14.6, 56/330, 327.1, 327.2, 328.1, 16.6; 460/23, 99, 100, 119

[56] References Cited

U.S. PATENT DOCUMENTS

| | | | |
|---|---|---|---|
| 3,509,885 | 5/1970 | Louks et al. | 460/100 |
| 4,214,427 | 7/1980 | Bobard et al. | 56/330 |
| 4,913,679 | 4/1990 | Bender | 460/99 X |
| 5,287,687 | 2/1994 | Urich et al. | 56/327.1 |
| 5,542,242 | 8/1996 | Poulos | 56/16.6 X |

Primary Examiner—Terry Lee Melius
Attorney, Agent, or Firm—Dean P. Edmundson

[57] ABSTRACT

Apparatus is disclosed for picking or harvesting agricultural products from plants on which they were grown. The apparatus is especially useful for harvesting peppers of various types (e.g., chili, bell, etc.). The apparatus includes fingers carried on elongated opposing bars which are inclined relative to the ground and are moved through a circular path such that opposing fingers engage and lift the products and separate them from the plants. A trash removal system removes plant stems, leaves and debris. Preferably a hopper is included for receiving and carrying the harvested products until the operator desires to transfer the products to a truck or other carrier. The apparatus is very efficient in harvesting agricultural products and does not crush or damage fragile products or the plants on which the products are grown.

17 Claims, 10 Drawing Sheets

HARVESTING APPARATUS

CROSS-REFERENCE TO RELATED APPLICATION

This application is based upon, and claims priority from, our co-pending provisional application Ser. No. 60/026,586, filed Sep. 20, 1996, incorporated herein by reference.

FIELD OF THE INVENTION

This invention relates to harvesting apparatus. More particularly, this invention relates to apparatus for picking or harvesting agricultural products from bushes or vines.

BACKGROUND OF INVENTION

Mechanical harvesting equipment has been widely available for harvesting agricultural products such as corn, beans, grain, cotton and the like. However, for harvesting easily bruised agricultural products (such as peppers), mechanized harvesters have not been entirely satisfactory. Consequently, the harvesting of such products is still being performed largely by means of manual labor (which is very costly and time consuming). A mechanical harvester is described in U.S. Pat. No. 5,287,687, incorporated herein by reference. The present invention provides improvements to such harvester.

SUMMARY OF THE PRESENT INVENTION

The present invention provides apparatus for harvesting a wide variety of bush or vine agricultural products such as those which are easily bruised or crushed (e.g., peppers, berries, green beans, peas, cucumbers, canning tomatoes, etc.). The apparatus is fully mechanized an(i only requires one person to operate. No other manual labor is required.

The apparatus, in a preferred embodiment, includes:

(a) a wheeled frame;

(b) a power source carried on the frame;

(c) header means carried by the frame and powered by the power source and including spaced-apart and cooperating plucking means having fingers for lifting the agricultural product and separating it from the stem or stalk of the plant;

(d) conveyor means for conveying the separated products away from the plucking means;

(e) trash removal system for removing plant stems, leaves and debris from the harvested agricultural products; and (f) hopper means for receiving and carrying the harvested products until the operator desires to transfer the products to a truck or other carrier.

The apparatus is self-propelled and is able to harvest products from the entire plant or from a selected portion of the plant if that is desired. The apparatus is able to harvest products even from the bottom or lowest portion of a plant, even if the products are at ground level.

In another aspect, the present invention provides a trash removal system which is useful in various types of harvesters or agricultural product handling systems. The trash removal system includes (a) means for directing pressurized air flow through a stream of agricultural products to separate trash and debris, and (b) fan means for carrying the trash and debris away and for shredding it.

In yet another aspect, the present invention provides a hopper system for receiving and transporting harvested agricultural products. The hopper system is useful in connection with a variety of agricultural harvesters. The hopper system includes a rotatable bin having a plurality of separate compartments. When one compartment is filled, the bin rotates to position an empty compartment in a position where it can receive harvested products. An endless belt extends around the lower portion of the bin to prevent the harvested products from falling out of the compartments. When all of the compartments are full, they can be emptied by lowering a spout and rotating the endless belt, whereby the products in the compartments sequentially empty onto the belt and are conveyed through the spout to a truck, wagon or other desired device.

Other aspects and features of the invention are described in the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

In the drawings there is illustrated a preferred embodiment of harvesting apparatus 10 of the invention for picking agricultural products from the plants on which they are connected or suspended. The apparatus comprises a frame 12 having front drive wheels 13 and rear wheels 14. A cab 16 is attached to the frame to accommodate the operator of the apparatus. An engine (e.g., gas or diesel) 17 is carried by the frame and serves as the power source for the apparatus.

Header means 20 is pivotably attached to the forward end of the frame by means of a pin on opposite sides of the header means. The forward end of the header means can be raised or lowered by means of hydraulic cylinders 28.

The header means comprises spaced-apart plucking means for removing the desired agricultural products from the plants. In the embodiment shown in the drawings, the apparatus includes a first set of cooperating plucking means 30 and 32, and it also includes a second set of cooperating plucking means laterally spaced from the first set. Each set of plucking means is adapted to harvest products from a separate row of plants as the apparatus is driven across a field. The operation of the plucking means is described in more detail hereafter.

After the agricultural products have beer separated from the plants, the products are conveyed upwardly and rearwardly by means of a chain driven elevator to a transversely oriented conveyor belt 24 located rearwardly of the plucking means.

The harvested products are conveyed to the vertical elevator belt 25 and then to the trash removal system where unwanted debris (such as leaves, stems and portions of the plants themselves) is removed. The belt 25 may include upstanding fingers 25A or other such means for preventing the harvested products from rolling or sliding down the belt 25.

Each plucking means comprises at least one elongated bar having a plurality of spaced-apart fingers attached thereto. Thus, plucking means 30 comprises at least ore elongated bar 30A having a plurality of fingers 30B attached thereto (or carried thereon) and projecting laterally from one side of the bar 30A. Similarly, plucking means 32 comprises at least one elongated bar 32A having a plurality of fingers 32B attached thereto (or carried thereon) and projecting laterally from one side of the bar 32A.

Opposite ends of bar 30A are rotationally attached or mounted to rotatable disk member 30D and 30E by means of bolts 41 and an appropriate bearing. Opposite ends of bar 32A are similarly rotationally attached or mounted to separate rotatable disk members.

Preferably there are several elongated bars 30A mounted around the periphery of disk 30D (and, correspondingly, the opposite ends of the plurality of bars 30A are mounted to the periphery of disk 30E so that the bars 30A are parallel to each other). In a similar fashion, there preferably are a plurality of bars 32A mounted at their opposite ends to the periphery of separate upper and lower disks.

Figure 4:
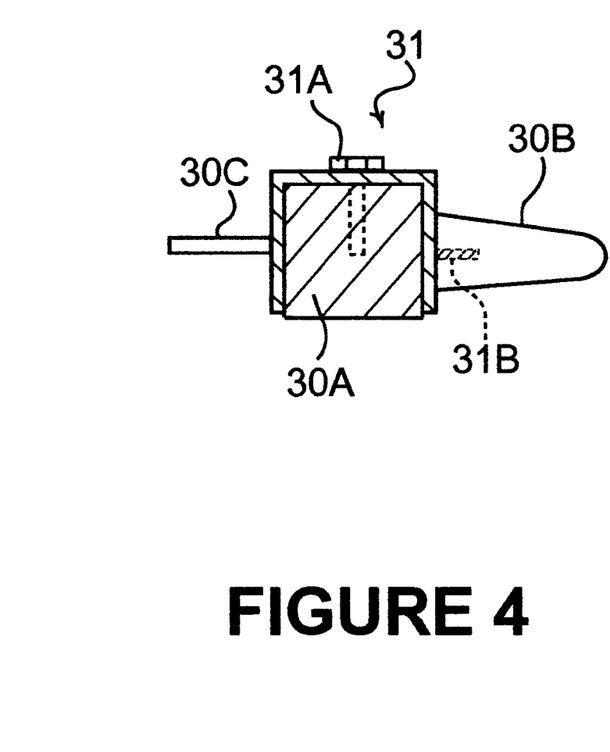
FIG. 4 is a cross-sectional view taken along line 4—4 in FIG. 3.
Figure 5:
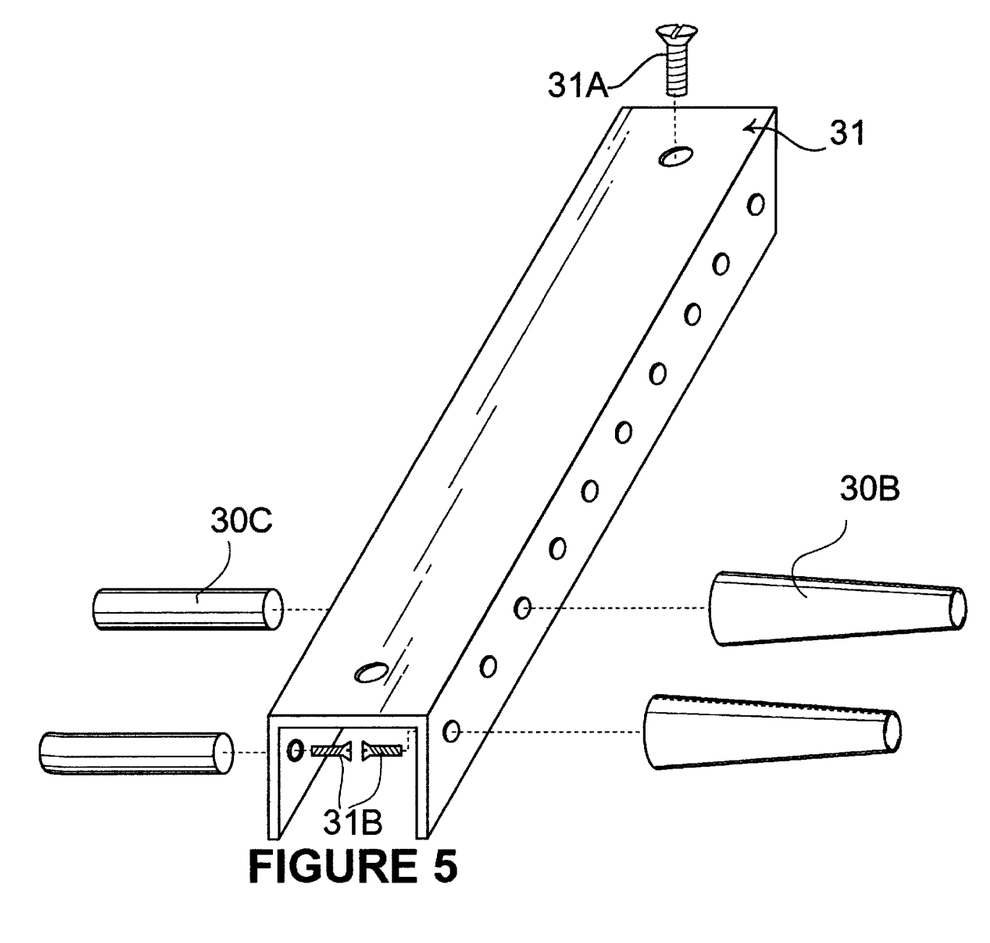
FIG. 5 is a perspective view of one embodiment of a plucking means segment useful in the apparatus of FIG. 1.

Preferably the fingers 30B, 32B, etc. are secured at their base ends to an elongated U-shaped channel 31 as shown in FIGS. 4 and 5. The channel 31 is then positioned onto bar 30A and secured in place by bolts or screws 31A. There are several of such channel segments 31 positioned end-to-end on bar 30A, bar 32A, etc. This arrangement is very advantageous because it enables some or all of the segments to be quickly removed from bars 30A, 32A, etc. When desired (e.g., in order to replace one or more segments with different types of fingers, or to remove fingers from certain vertical locations on the head, etc.).

Figure 6:
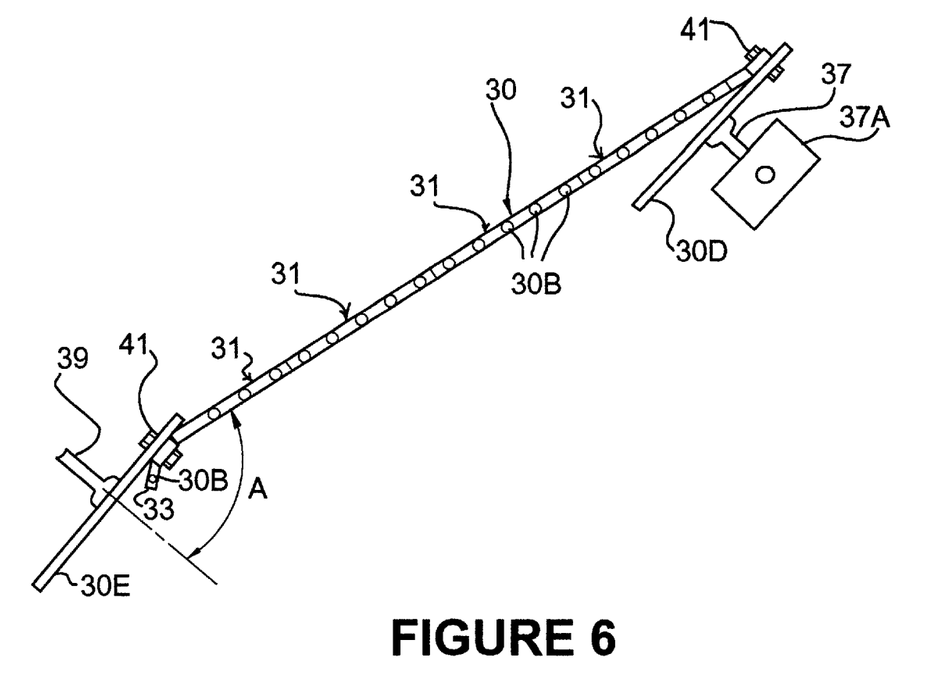
FIG. 6 is a perspective view of a preferred embodiment of plucking means useful in the invention.

As illustrated in FIG. 6, the disks 30D and 30E are parallel to each other and are inclined relative to a horizontal plane. As a result, bar 30A is also inclined relative to a horizontal plane. For ease of illustration, only one bar 30A is shown in FIG. 6. The angle A between bar 30A and the rotational axis of disk 30E is less than 90°.

Figure 7:
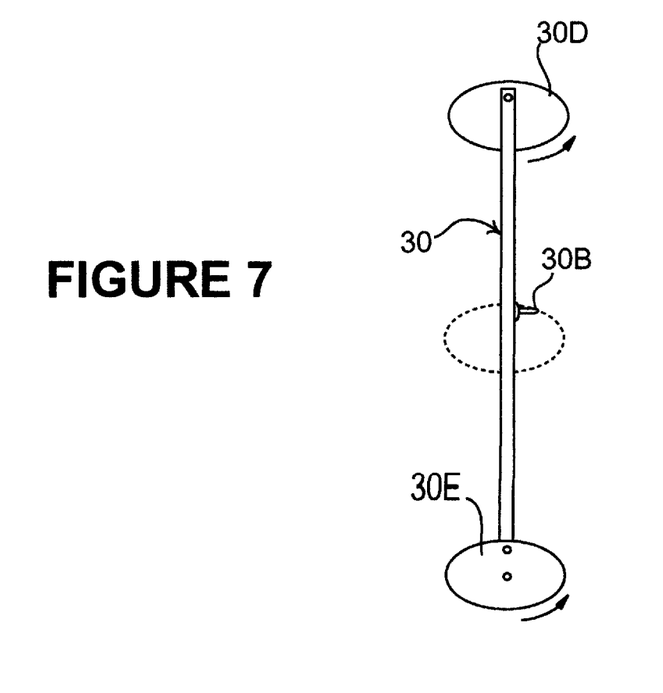
FIG. 7 is a front view illustrating the path of a given finger on one of the elongated bars.

Disk 30E is adapted to rotate in conjunction with shaft 39, and disk 30D is adapted to rotate in conjunction with shaft 37 (driven by gearbox 37A). Disk 30E is an idler. As the disks rotate, each bar 30A is forced to move through a path such that each finger 30B on the bar moves through a circular path which is inclined relative to a horizontal plane. This is shown by means of dotted lines in FIG. 7. The preferred speed of rotation of the disks is about 50 to 200 rpm.

The fingers on opposing bars 30A and 32A cooperate with each other to engage the product (e.g., a pepper) which is suspended from a plant. As the disks on which the bars 30A and 32A are mounted rotate in the directions shown, the fingers 30B and 32B move towards each other (and preferably interleave or nearly interleave) and then lift so as to reach under the product and lift it relative to the plant. Then the fingers on bars 30a and 32A move upwardly and away from each other, while successive bars 30A and 32A move towards each other and lift in the same manner.

Because the bars are inclined, and because the harvesting apparatus is moving forwardly at all times, the cooperating fingers each lift the product only a very short distance before the fingers move away from each other again to allow fingers on successive bars to move towards each other and lift the product a further small distance. This is very desirable because it tends to prevent the entire plant from being torn out of the ground by the plucking means. The operation of the plucking means generates a certain amount of vibration in the plant and this helps to loosen ripened product from the plant.

The forward end of each bar 30A, 32A, etc. includes a downwardly-projecting bar 33 which extends below attachment bolt 41 and below disk 30E, etc. A finger 30E; (32B, etc.) is secured to the bar 33. Thus, the bar 33 enables the lowest finger 30B (32B, etc.) to engage agricultural products even at the lowest part of the plant (even at ground level). This is a very important advantage.

After the product has been separated or loosened from the plant, it is typically carried by the fingers and/or the stripper teeth 30C (or 32C) to vertical conveyors in the header means. The stripper teeth 30C and 32C are generally lying in the same plane as the respective fingers 30B or 32B. The teeth are secured to the opposite side of the bar 30A or 32A as fingers 30B or 32B, respectively, by screws 31B and extend outwardly a distance less than the length of the fingers 30B or 32B so that they do not interfere with fingers 30B or 32B during operation. The teeth 30C and 32C are preferably resilient and flexible.

Each finger 30B and 32B remains horizontal as the mounting disks rotate. The bars 30A and 32A remain inclined at the same angle as each other.

The operation of additional plucking means is analogous to the operation just described for plucking means 30 and 32.

The size of the fingers may vary, as desired. For example, the length of the fingers may vary from about 1 to 5 inches. The diameters may also vary, e.g., from about 0.25 to 2 inches. The diameter of each finger may also vary along its length. Preferably the fingers on bar 30*a* are of the same general size of the fingers on bar 32A. The shape of the fingers may also vary. Preferably the fingers are of smaller diameter near their free end. In other words, it is preferable for the fingers to taper slightly from their fixed end to their free end. Preferably the fingers are resilient (e.g., they may be composed of rubber) so that they can bend or deflect slightly.

The spacing between adjacent plucking means may also be varied, as desired. For example, the spacing may be adjusted by loosening one set of plucking means and sliding it toward or away from another set of plucking means.

The height of the forward end of the header means relative to the ground is also adjustable. One embodiment of automatic adjustment means involves a shoe adapted to slide along the ground under the forward end of the header means. An arm is pivotably attached at one end to the shoe. The opposite end of the arm is secured to a shaft of a valve. A hydraulic supply hose is connected to the valve, the two hydraulic hoses and are connected between the valve and hydraulic cylinders. When the shoe moves downwardly (with the contour of the ground) the arm moves downwardly and thereby causes the shaft to rotate in a first direction. As a result, the valve enables hydraulic fluid to pass through one of the hoses to cause the cylinder to lengthen (and thereby tilt the header downwardly). When the shoe is urged upwardly by the ground, the shaft is rotated in the opposite direction to cause hydraulic fluid to flow through the other hose to enable the cylinder to raise the header means. Spring means may be included to assist the cylinder in raising the header means, if desired.

In another embodiment, proximity sensors may be positioned adjacent the shoe to control up or down movement of the header means, with an appropriate time delay mechanism included in order to smooth the up or down height adjustment.

The operation of the rotating plucking means in the apparatus of this invention is gentle to the vine or bush and also to the product which is to be harvested from the vine or bush. In other words, the fingers on the plucking means move in such a manner that opposing fingers on adjacent plucking means are always in motion in an inclined circular path as previously described and as shown in the drawings. In this manner, the multiple opposing fingers move towards each other and then away from each other while they are lifting the product from the vine or bush. This operation is highly preferably over apparatus in which opposing fingers move generally in concert with each other at a fixed distance between the opposing fingers.

Figure 8:
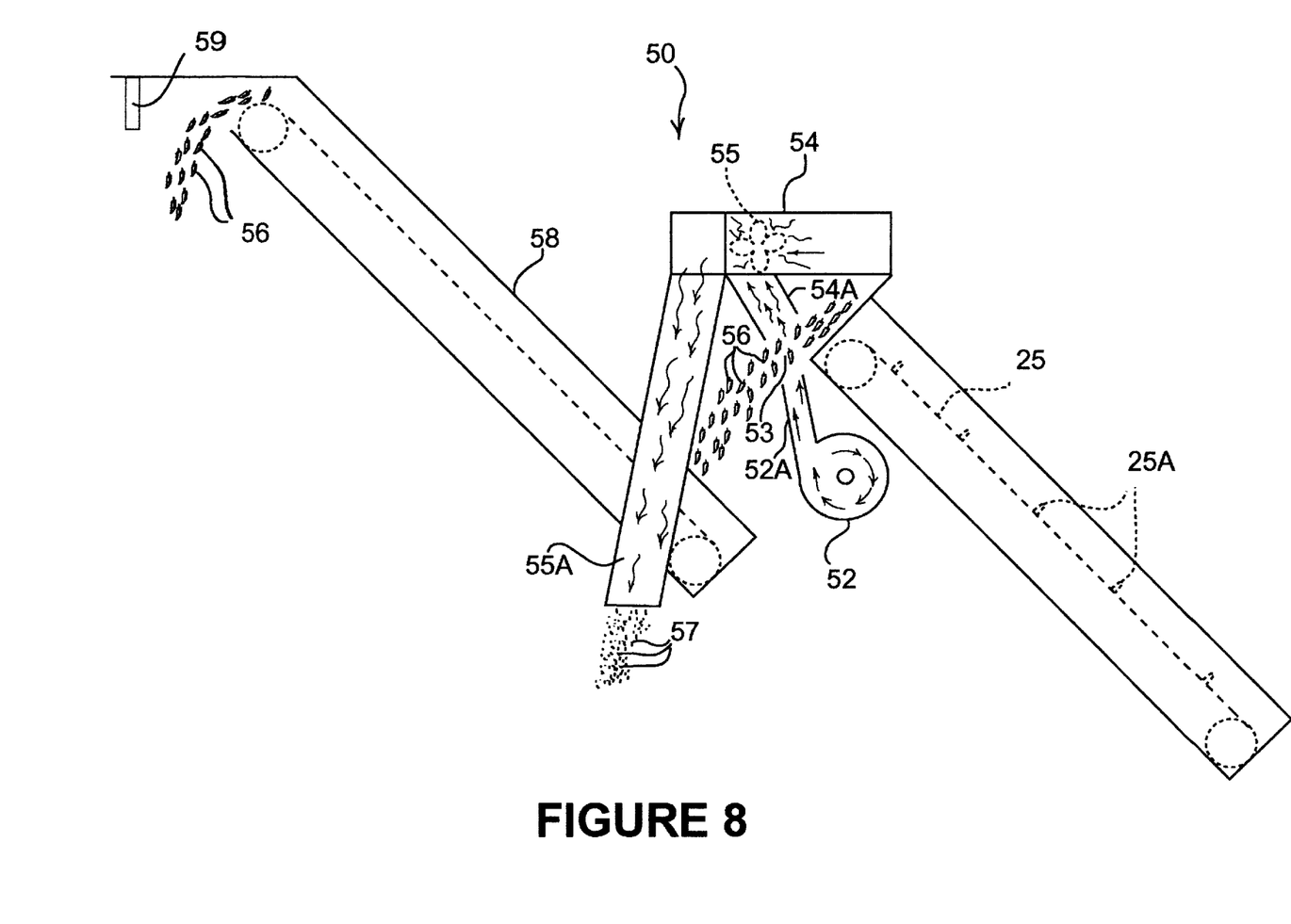
FIG. 8 is a side elevational view of the trash removal system of the invention.

The trash removal system 50 is illustrated in FIG. 8. The harvested products (and debris such as leaves, stems, plant portions, weeds, etc.) are elevated by means of belt 25 from the header. When the products 56 (and debris) fall off of the upper end of the belt 25, they fall through a stream of upwardly-flowing air produced by fan 52 through conduit 52A. Above the conduit 52A there is a conduit 54A leading upwardly to a fan 55 in housing 54. Fan 55 rotates rapidly and draws air upwardly through conduit 54A by means of suction or vacuum. The combined effect of the moving air stream in gap 53 is to carry upwardly (away from the harvested products) all unwanted debris which is then cut into small pieces 57 and discharged down to the ground through tube 55a The harvested products 56 fall onto vertical elevator 58 which conveys them to the hopper system on the harvesting apparatus.

Figure 11:
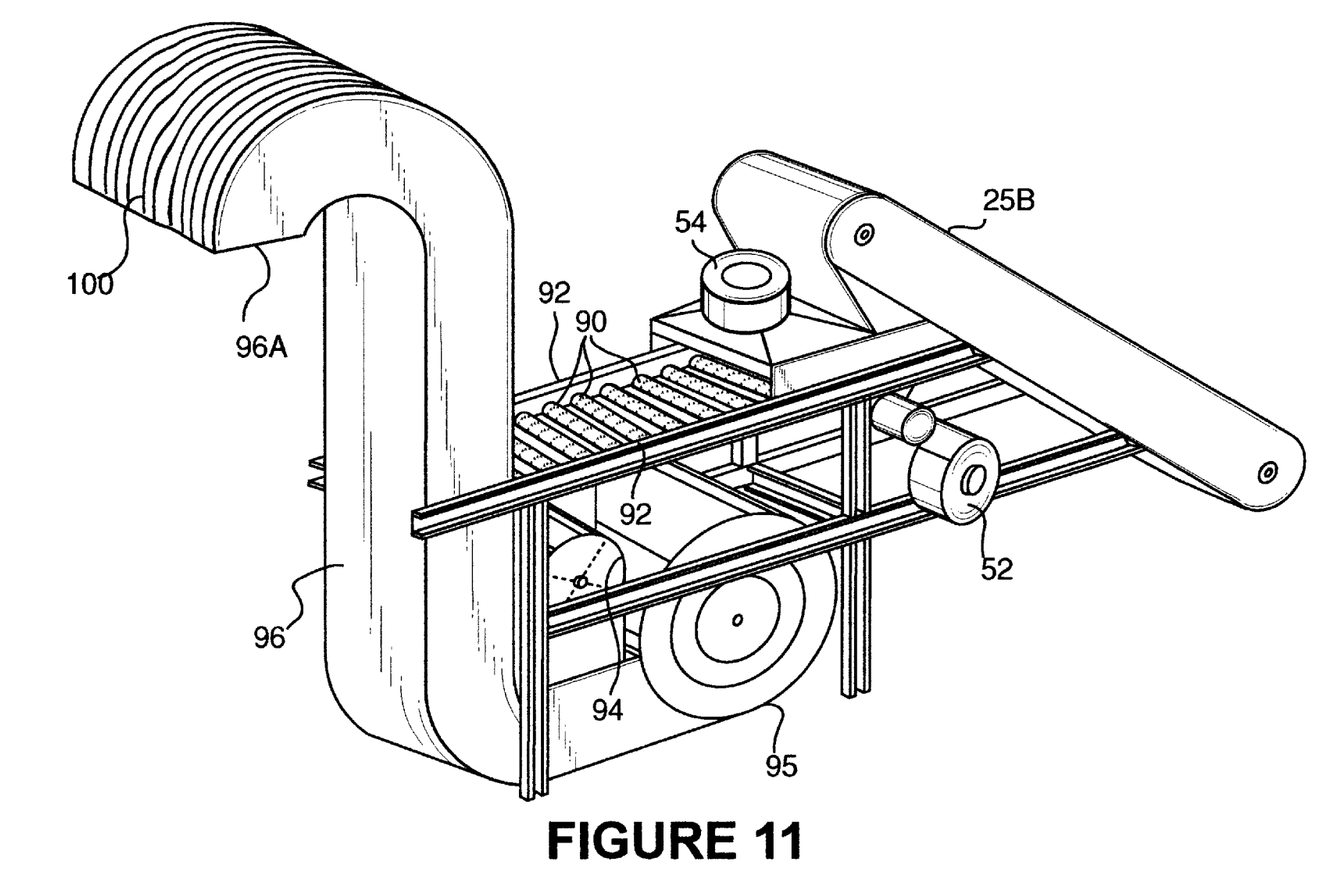
FIG. 11 is an isometric view illustrating the trash removal system and means for elevating agricultural product to a hopper.

FIG. 11 is an isometric view showing another embodiment of a trash removal system and a spout for moving the harvested product from the trash removal system to a hopper. Products from the header means move upwardly in elevator 25B. As the products exit the upper end of the elevator they fall into a gap between the upper fan 54 and the lower fan 52 (also shown in FIG. 8). Debris (leaves, stems, etc.) is carried upwardly by the air flow and is shredded by fan 54. The desired agricultural products (e.g., peppers) fall onto horizontally-disposed rollers 90 supported between opposite frame members 92. Each roller is rotatable about its own axis by means of a driven chain 91 which engages teeth 90A on one end of each roller. The rollers 90 convey the peppers rearwardly where they fall into a rotary valve 94 which includes four radially-spaced paddles 94A. Preferably the paddles are spaced such that pressurized air in conduit 96 from fan 95 cannot proceed through rotary valve 94, yet the peppers 56 are able to be passed downwardly through valve 94 (which may rotate, for example, at about 30 rpm). The pressurized air then pushes the peppers through conduit 96 where they proceed upwardly and then exit out through the upper end 96A (for example, where the peppers fall into the hopper).

Figure 12:
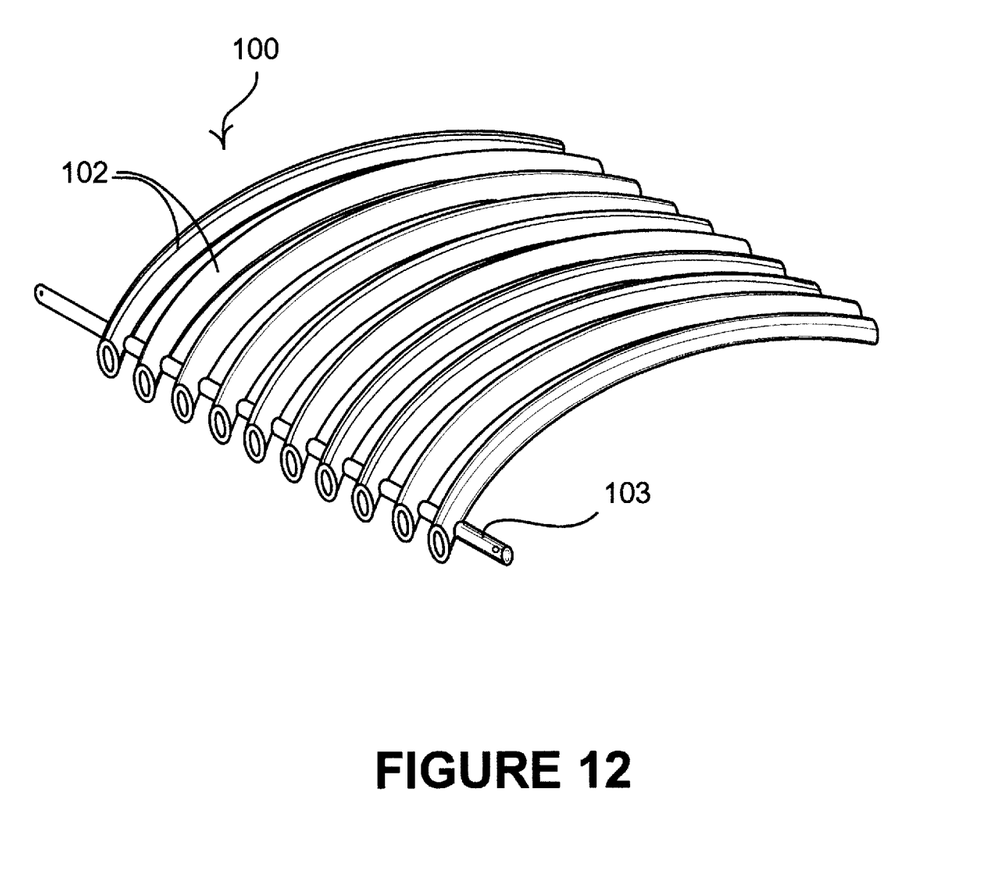
FIG. 12 is an isometric view of a grate which can be used at the upper end of the spout leading to a hopper for harvested product.
Figure 13:
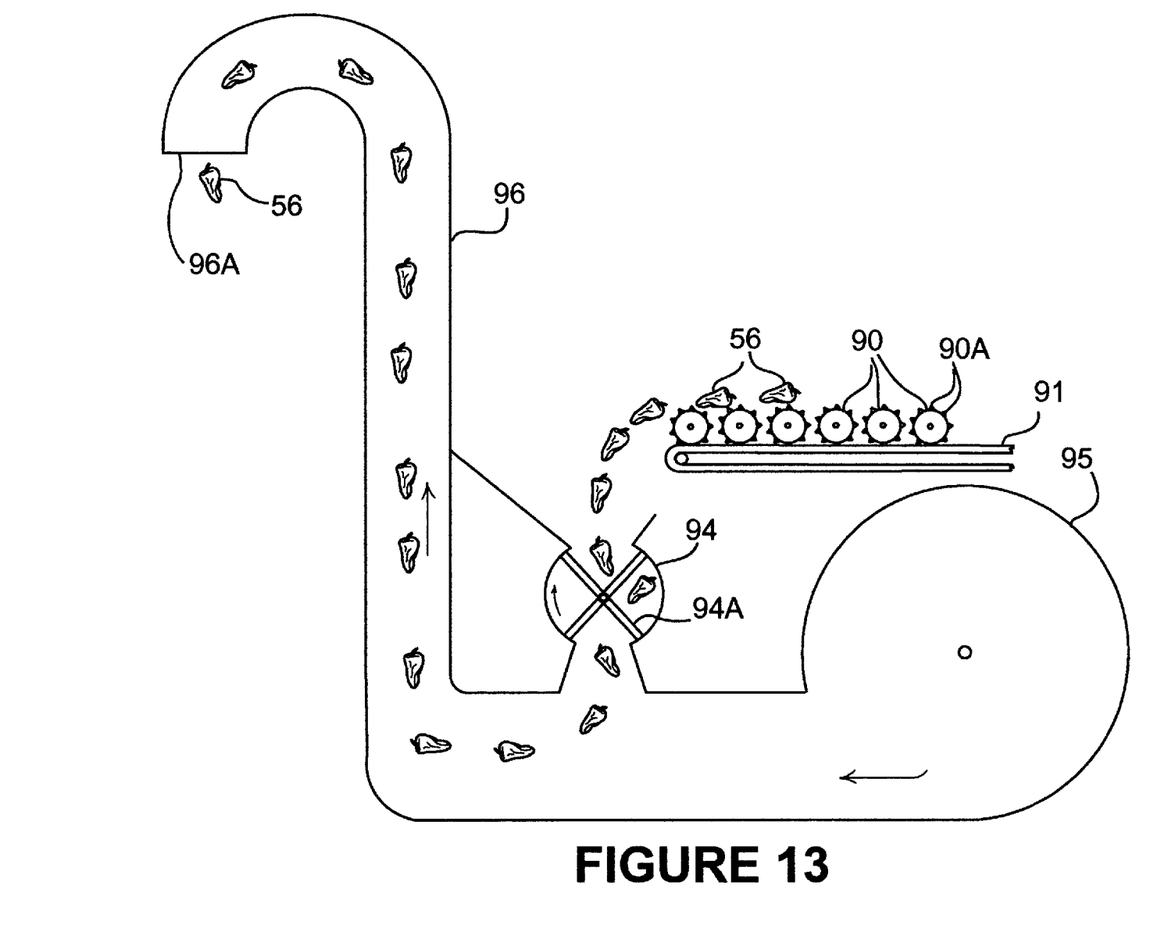
FIG. 13 is a side elevational view showing the manner in which harvested product is conveyed to a spout leading to a hopper.

Preferably the upper end of the conduit. 96 includes a grate 100, as shown in FIGS. 11 and 12. The grate 100 comprises a plurality of parallel, spaced-apart pipes 102 which are curved to correspond with the shape shown in FIGS. 11 and 13. A rod 103 extends through the end of each pipe, as shown. The spaces between adjacent pipes 102 allow dust and small particles to escape outwardly, while the peppers remain in the conduit and are directed into the hopper.

The hopper system 60 comprises a large bin having a circular cross-section. A plurality of dividing walls 62 define a plurality of separate compartments (e.g., six) in the bin for the harvested product. Each dividing wall extends radially from the center of the bin toward the outer periphery. Each wall is generally perpendicular to the front and rear walls of the bin. The front and rear walls are parallel to each other. Preferably each dividing wall includes inner and outer sections which are planar and form an obtuse angle with respect to each other. The front and rear walls of the bin preferably comprise metal screen or expanded metal.

Figure 1:
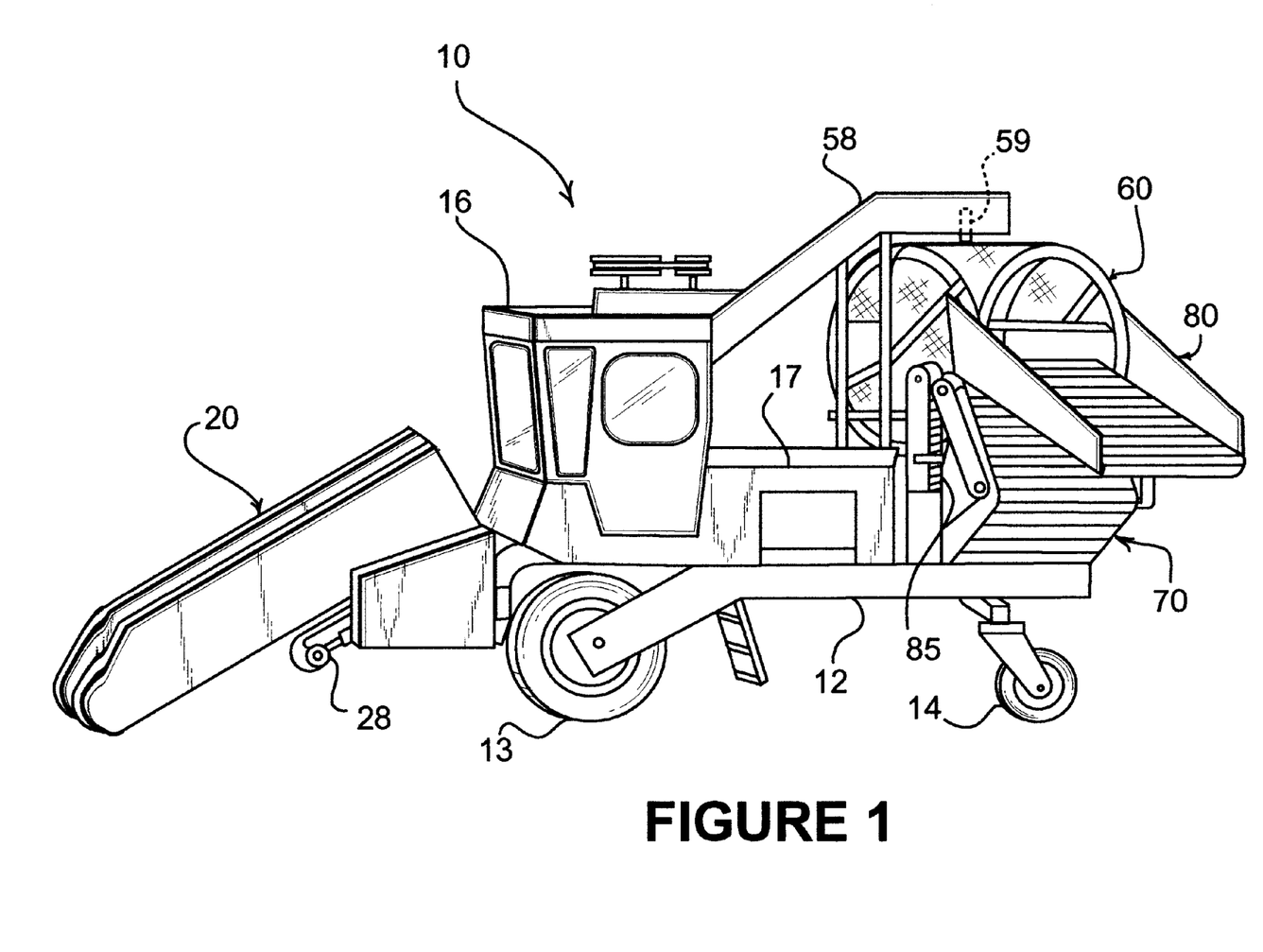
FIG. 1 is a side perspective view of a preferred embodiment of harvesting apparatus of the invention.
Figure 2:
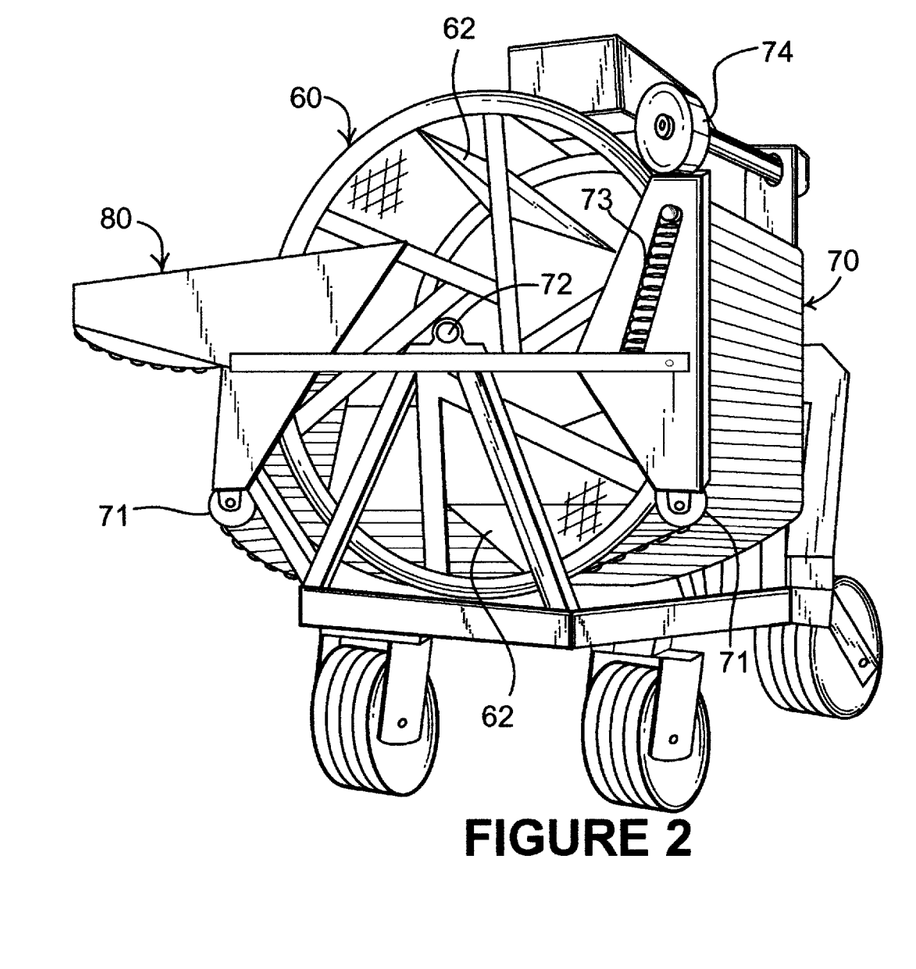
FIG. 2 is a rear perspective view of the apparatus shown in FIG. 1.
Figure 3:
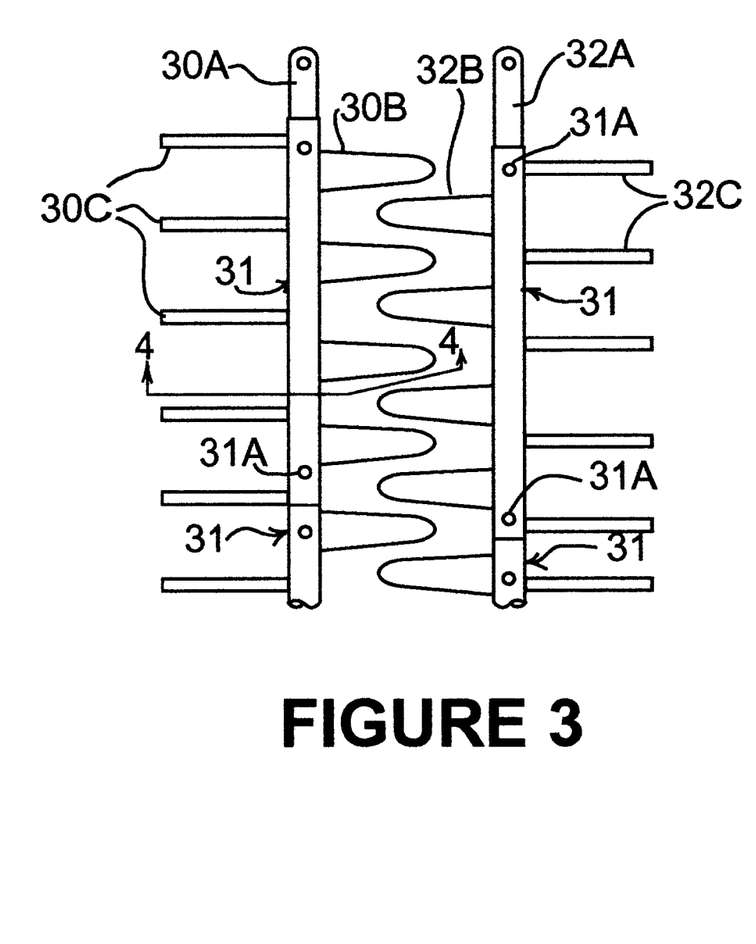
FIG. 3 is a top view showing the cooperating plucking means used in the apparatus of FIG. 1.

An endless belt 70 extends around the lower portion of the bin 60 so as to close the outer periphery or top of each compartment which would otherwise spill product due to gravity. The belt extends around idler rollers 71 and other rollers not visible in the drawings. The belt can be tightened or loosened by means of spring-loaded tensioner 73. As shown in FIG. 2, the endless belt extends at least 180° around the periphery of the bin.

The bin is supported in rotatable manner on axle 72. Hydraulically powered drive wheel 74 engages the outer edge of the bin 60 and causes it to rotate a few degrees when one compartment in the bin is filled with harvested product. A proximity sensor 59 in the upper end of the elevator 58 senses when one compartment is full and causes the hydraulic motor to rotate the bin to bring an empty bin compartment into position below the elevator 58 discharge.

Figure 9:
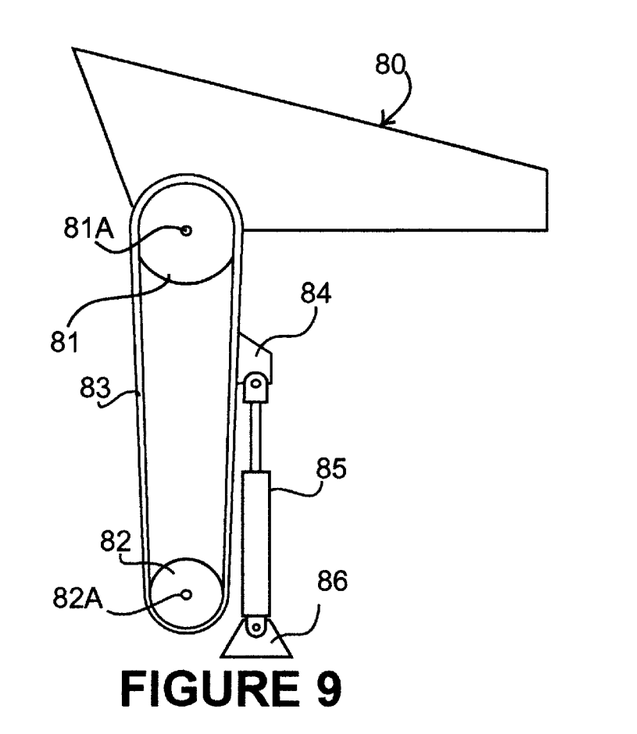
FIG. 9 is a front elevational view showing the elevator discharge spout control system useful in the apparatus of the invention.
Figure 10:
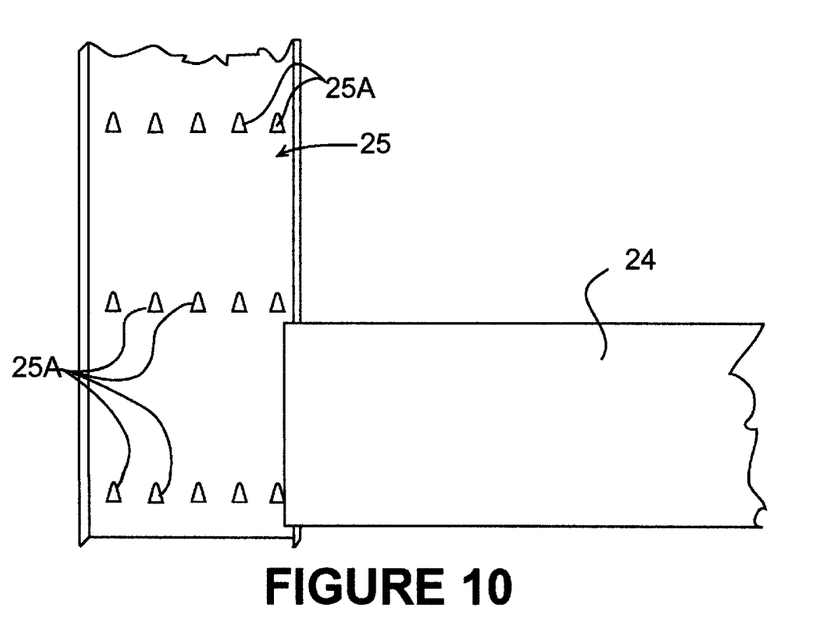
FIG. 10 is a top view showing the conveyor belt in the header for conveying harvested product to a vertical elevator leading to the trash removal system.

The hopper system also includes a discharge spout 80 which is pivotable between raised and lowered positions. When the harvester is in operation, the spout is in the raised position. When all of the compartments in the bin are full, or when it is otherwise desired to empty the compartments, the spout is moved to its lowered position. The system for doing this is illustrated in FIG. 9. An axle sprocket 81 is rotatable relative to a horizontal axle 81A, and the sprocket is secured to the spout 80. Idler sprocket 82 is carried on pivot pin 82A secured to the frame of the machine.

An endless chain 83 extends around sprockets 81 and 82. A lug 84 secured to the chain is connected to one end of a hydraulic cylinder 85. The opposite end of the cylinder is connected to a mounting lug 86, as shown.

When the cylinder ram is retracted, the chain causes the sprocket 81 and spout 80 to rotate in the same direction, whereby the spout 80 is pivoted to its discharge position. When the cylinder is extended, the spout is caused to pivot upwardly.

The endless belt 70 frictionally engages the periphery of the bin 60. Accordingly, when the hydraulic motor is powered to cause rotation of the bin, the endless belt 70 is caused to move relative to its support rollers. Because the belt 70 also extends along the length of the discharge spout, continuous movement of the belt 70 will convey harvested product from each successive compartment to the discharge spout and out through the spout (for example, to a truck or trailer for transport). In other words, harvested products from each successive compartment empty onto the endless belt in the spout section and are conveyed away to a truck, trailer, etc.

Other variants are possible without departing from the scope of this invention. For example, the hopper system described and illustrated herein can be used in other types of harvesting equipment.

What is claimed is:

1. Apparatus for picking agricultural products from plants, said apparatus comprising:
   (a) a wheeled frame;
   (b) a power source carried on said frame;
   (c) header means carried by said frame and powered by said power source; wherein said header means comprises first and second spaced apart and cooperating plucking means; wherein each said plucking means comprises spaced-apart fingers; wherein said fingers are adapted to move in a manner such that said fingers engage said products and separate them from said plants;
   (d) conveyor means for conveying said products away from said plucking means;
   (e) trash removal means for removing plant stems, leaves and debris from said products; wherein said trash removal means comprises:
       (i) first fan means;
       (ii) second fan means spaced from said first fan means; wherein said first fan means directs air flow in the direction of said second fan means; wherein said second fan means directs air flow in a direction away from said first fan means; wherein harvested products and debris are passed through the space between said first and second fan means and said debris is drawn through said second fan means; and
   (f) hopper means for receiving and carrying said products.

2. Apparatus in accordance with claim 1, wherein each said plucking means comprises first and second spaced-apart rotatable mounting means and a plurality of elongated bars attached between said mounting means, wherein said fingers are secured to said bars and project outwardly therefrom; and wherein said bars are inclined relative to a horizontal plane.

3. Apparatus in accordance with claim 2, wherein said first and second mounting means comprise first and second disk members; wherein said disk members are parallel to each other and are inclined relative to a horizontal plane; wherein the fingers mounted on at least one of said bars of said first plucking means interleave with the fingers mounted on at least one of said bars of said second plucking means when said disk members are rotated.

4. Apparatus in accordance with claim 1, wherein said header means includes forward and rearward ends; wherein said rearward end is pivotably attached to said frame.

5. Apparatus in accordance with claim 1, wherein said header means further comprises third and fourth plucking means disposed parallel to said first and second plucking means.

6. Apparatus in accordance with claim 1, wherein said hopper means comprises a bin having a center, a circular cross-section, and parallel front and rear walls; wherein said bin includes a plurality of dividing walls extending from said center to the periphery of said bin; wherein said bin is rotatably mounted on said frame.

7. Apparatus in accordance with claim 6, further comprising an endless belt extending around at least a portion of the periphery of said bin.

8. Apparatus for picking agricultural products from plants, said apparatus comprising:
   (a) a wheeled frame;
   (b) a power source carried on said frame;
   (c) header means carried by said frame and powered by said power source; wherein said header means comprises first and second spaced apart and cooperating plucking means; wherein each said plucking means comprises spaced-apart fingers; wherein said fingers are adapted to move in a manner such that said fingers engage said products and separate them from said plants;
   (d) conveyor means for conveying said products away from said plucking means;
   (e) trash removal means for removing plant stems, leaves and debris from said products; and
   (f) hopper means for receiving and carrying said products; wherein said hopper means comprises a bin having a circular cross-section and being rotatably mounted on a shaft; wherein said bin includes front and rear vertical wall members and a plurality of dividing walls which divide said bin into a plurality of radial compartments; and further comprises an endless belt extending at least 180° around the periphery of said bin.

9. Apparatus in accordance with claim 8, wherein each said dividing wall is connected between said front and rear vertical wall members.

10. Apparatus in accordance with claim 9, further comprising driving means for rotating said bin.

11. Apparatus in accordance with claim 10, further comprising sensor means for determining when a particular compartment is filled with said agricultural products.

12. Apparatus in accordance with claim 10, further comprising a discharge spout mounted adjacent said bin; wherein said endless belt extends around said discharge spout; and wherein said discharge spout is movable between raised and lowered positions.

13. A hopper system for receiving and carrying agricultural products, said system comprising:
   (a) frame means;
   (b) bin means having a circular cross-section and being rotatably mounted on said frame means; wherein said bin means includes front and rear vertical wall members and a plurality of dividing walls which divide said bin means into a plurality of radial compartments; and further comprising an endless belt extending at least 180° around the periphery of said bin means.

14. A hopper system in accordance with claim 13, wherein each said dividing wall is connected between said front and rear vertical wall members.

15. A hopper system in accordance with claim 14, further comprising driving means for rotating said bin means.

16. A hopper system in accordance with claim 15, further comprising sensor means for determining when a particular compartment is filled with said agricultural products.

17. A hopper system in accordance with claim 15, further comprising a discharge spout mounted adjacent said bin means; wherein said endless belt extends around said discharge spout; and wherein said discharge spout is movable between raised and lowered positions.

* * * * *